United States Patent Office 3,667,752
Patented June 6, 1972

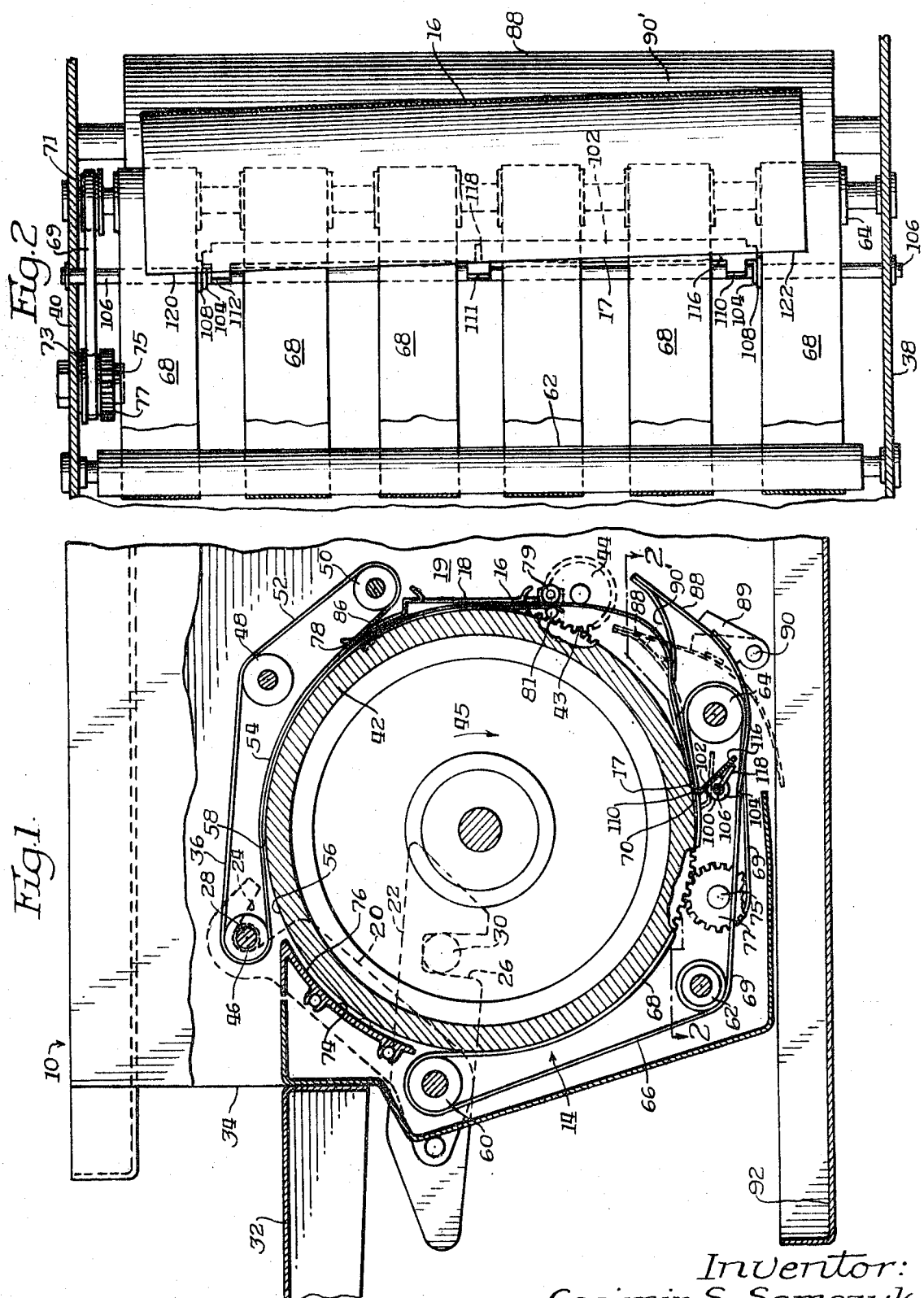

3,667,752
DOCUMENT TURNAROUND WITH IMPROVED AUTOMATIC SKEW CORRECTION
Casimir S. Samczyk, Franklin Park, Ill., assignor to Bell & Howell Company, Chicago, Ill.
Continuation-in-part of application Ser. No. 855,891, Sept. 8, 1969. This application Nov. 6, 1969, Ser. No. 874,552
Int. Cl. B65h 9/06
U.S. Cl. 271—53
4 Claims

ABSTRACT OF THE DISCLOSURE

This invention is directed to apparatus for repeatedly transporting an original document along a straight line path through an exposure station of an office copying machine. The transport apparatus includes a movable member in the normal path of movement of the leading edge of the original document. The leading edge strikes the movable member during each cycle of the document through the transport apparatus, causing localized buckling of the document thereby automatically correcting a skew condition which the document may acquire as a result of improper insertion into the copying machine or misalignment of the document transport members.

This application is a continuation in part of United States application Ser. No. 855,891, filed Sept. 8, 1969, now abandoned.

FIELD OF THE INVENTION

This invention relates in general to office copying machines. In particular, this invention relates to document transport means for repeatedly conveying an original document past an exposure station of an office copying machine, including improved automatic skew correction means for correcting the path of movement of a document which may fortuitously deviate from a straight line path.

DESCRIPTION OF THE PRIOR ART

In one well known type of office copying machine the original document is inserted into the machine and is conveyed by a suitable document transport mechanism through an interior portion of the machine, past an exposure station and is subsequently returned to the operator. One copy of the document is produced during each movement cycle of the document past the exposure station. To facilitate reproduction of a large number of copies of a single document, such copying machines may employ a document transport mechanism capable of recirculating or turning around an original document and repeatedly conveying it past the exposure window any selected number of times. Prior art document transport and recirculating mechanisms typically employed plural pairs of nip forming transport rollers and guides which define a document transport path through the exposure station.

A vexatious problem in many prior art document recirculating or turnaround transport mechanisms is skewing or deviation of the document from a straight line path of travel. Proper alignment of the document with the copy paper is effected by a straight path of travel of the original document past the exposure station, thus a document which is transported past the exposure station in a skewed condition is improperly aligned with the copy paper. Skewing is increasingly troublesome when a document is recirculated and conveyed past the exposure window a number of times since if the document is originally inserted askew, the amount of deviation and misalignment generally increases during each recirculation cycle.

Skewing is most often caused by improperly inserting a document into the copying machine, however, even a document which is properly inserted may deviate from its straight line path of movement due to uneven transport roller pressure, nonuniform peripheral speeds of the transport rollers, or misalignment of various document guides. This is especially prevalent in document recirculating apparatus wherein a number of transport rollers, belts and guides may be employed.

While document skew correction apparatus is not unknown in the prior art, one known defect in such prior art apparatus is the inability to properly perform the skew correction function after several cycles of the document through the turnaround apparatus due to the "set" or curl which the document assumes, particularly adjacent its leading edge. This curl results in improper cooperation or the lack of cooperation between the leading edge and the skew correcting apparatus, which reduces or prevents the skew correction function.

SUMMARY OF THE INVENTION

This invention obviates many of the above mentioned problems and difficulties of recirculating an original document through a document transport path extending past an exposure station whereat the original document is exposed to a copy sheet or other image receiving media, by providing improved means incorporated in the transport mechanism for automatically correcting skew conditions which the document may acquire.

In accordance with the invention, means are provided for positively transporting the rear portion of the document and for guiding the leading edge of the document along a path intercepting movable abutment means such as a plurality of pivotally mounted fingers which are oriented generally parallel to the leading edge of a straight traveling document. The forwardmost portion of the leading edge of a skewed document thus strikes at least one of the fingers prior to the time that other portions of the leading edge strike the remaining fingers, causing the document to buckle rearward of the forwardmost edge portion. Continued conveyance of the document eventually causes the entire leading edge to engage all or substantially all of the fingers, pivoting them out of the path and releasing the leading edge in a generally straight condition. Immediately upon release, the leading edge is presented to and captivated by an entrance nip of the transport system in substantially the same straight condition as it leaves the fingers.

The leading edge of the original document strikes the fingers once during each cycle of the document through the recirculating mechanism thereby gradually straightening a grossly skewed document. A document which is skewed only a small amount will be straightened after only one cycle.

In addition, the invention includes a gate which is selectively movable between a first position whereat the document is continuously recycled through the apparatus and past the exposure station, and a second position whereat the document is directed out of the closed recycling path for return to the operator.

Accordingly, the primary object of this invention is to provide, in an office copier, document transport means for repeatedly transporting an original document past an exposure station and for automatically correcting any skew condition of the document.

It is also an object of this invention to provide, in an office copier, document recirculating means for repeatedly transporting a document past an exposure station and improved automatic skew correction means comprising means guiding the leading edge of the document into striking engagement with the pivotable member which causes the document to buckle in an area rearward of a forwardmost portion of the leading edge. The document is released from the member with its leading edge in a straightened condition.

A further object of this invention is to provide document recirculating means for repeatedly transporting a document past an exposure station of an office copying machine including means for correcting the skewed condition of said document comprising a plurality of pivotally mounted fingers disposed in the path of movement of the document leading edge for captivating and subsequently releasing the leading edge in a generally straightened condition and a transport entrance nip closely adjacent the fingers for immediately receiving the leading edge in the straightened condition presented thereto from the fingers.

Additional objects of this invention will become apparent to those versed in the art upon an understanding of the following detailed description of the document turnaround and automatic skew correction apparatus of the invention taken in conjunction with the accompanying drawings wherein a preferred embodiment of the invention is shown, and wherein:

FIG. 1 is an elevational side cross-sectional view of the front portion of an office copying machine including a document turnaround mechanism incorporating the improved automatic skew correction apparatus of the invention; and FIG. 2 is a top-plan, partial cross-sectional view of the improved skew correction apparatus shown in the same scale as FIG. 1, as viewed along offset line 2—2 thereof.

Referring now to FIG. 1 of the drawings, an office copying machine generally referred to by reference number 10 is seen to include a document turnaround or recirculating mechanism 14 for cyclically or repeatedly conveying an original document 16 having a leading edge 17 past a transparent exposure window 18 of an exposure station 19. Turnaround mechanism 14 may be firmly secured in the front of the machine by a pair of spring biased arms 20-22 having hooks 24-26 which cooperate with studs 28-30 projecting from the copying machine. The turnaround may thus be readily removed to facilitate clearance of paper jams. Documents are fed into the turnaround apparatus by placing the document face side up on a flat horizontal ledge 32 mounted at the front edge of the machine and sliding the document through an entrance opening 34 provided in the front wall until it enters the nip formed by a first series of transport belts 36, which are more fully described hereinafter.

Turning now additionally to FIG. 2, the document turnaround of the invention specifically comprises a frame formed by a right side wall 38 and a similiarly shaped left side wall 40. Side walls 38-40 are spaced apart a distance slightly greater than the width of the widest document which the copying machine is designed to reproduce. The walls rotatably support a large, centrally located transport drum 42 having an abrasive-like peripheral surface 56. The drum includes a large, integrally formed ring gear 43 adjacent one edge which is driven in the clockwise direction as shown by arrow 45, by a small drive gear 44 powered by the operative mechanism of the copying machine.

The document transport apparatus includes three parallel, spaced apart rollers 46, 48 and 50 which extend generally parallel to the drum axis, above the top of its peripheral surface. Rollers 46, 48 and 50 are mounted in suitable bearings in side wall frames of the copying machine, not shown, and are suitably coupled to the main drive motor. A series of narrow, upper feed belts 52 are trained about rollers 46, 48 and 50, and define an upper belt leg 54 which forms a permanent element of the copying machine. Belt leg 54 is not an integral element of the turnaround frame, however, as the turnaround frame is inserted and latched into the machine by hooks 24-26, the drum periphery engages the outer surface of the belt leg to provide transport for document 16. The drum periphery and belt leg 54 form a nip 58 into which the leading edge of the document is inserted by sliding it along ledge 32. Belts 52 are preferably fabricated of woven cotton, although other materials may also be employed.

A second group of feed rollers 60, 62 and 64, are rotatably mounted on suitable bearings between frame sidewalls 38 and 40. Roller 60 is located at the front end of the document turnaround, while rollers 62 and 64 are located at its lower or bottom end. A second series of narrow transport belts 66, similar in construction to belts 52, are trained about rollers 60, 62 and 64 to define a leg 68 which cooperates with the lower and front portions of drum surface 56. Since these rollers and transport belts are permanently carried between the frame sidewalls, the belts continuously engage the drum surface. Belts 66 define a transport entrance nip 70 for receiving leading edge 17 of the document 16 after passage through the exposure station.

Belts 66 are driven by a small drive belt 69 trained between a small-toothed pulley 71 secured to the left end of the shaft supporting roller 64 and a second toothed pulley 73 journaled on a fixed shaft 75 secured in sidewall 40. A spur gear 77 is fastened to the side of pulley 73 in meshing engagement with drum gear 43. Thus, drum gear 43 drives spur gear 77 which in turn rotates roller 64 to power belts 68.

A transport roller 79 is supported by the copying machine adjacent the exit end of the exposure station. This roller is driven by the main drive motor of the copier and forms a series of nips with a number of small wheels 81 journaled on the window frame to provide additional transport of the document.

In addition to the active transport members, a number of guide members are provided for guiding the document from one series of belts to another and for assisting in conveyance of the document past the exposure window. In particular, an arcuately shaped fixed guide member 74 having a guide surface 76 generally conforming to the outer diameter of the drum but spaced slightly away from peripheral surface 56 is provided for guiding a recirculating document from the exit nip formed by transport belts 66 and the drum surface to entrance nip 58 at the beginning of the transport path. A short guide 78 is provided adjacent the drum surface directly above the transparent window for guiding the document from the exit nip formed by belt 52 and the drum surface, past the exposure station.

Finally, a transverse gate 88 is provided at the lower end of the turnaround beyond roller 79. Gate 88 is supported for pivotal movement on a bracket 89 journaled on a transverse gate shaft 90 extending parallel to the document transport path. By means, not shown, the gate may be selectively pivoted between a first position, shown in full lines in FIG. 1, and a second position shown in dotted lines. Gate 88 includes an arcuately shaped recirculating guide surface 90', which functions, when disposed in its solid line position, to deflect the document into nip 70 for recirculating it through the transport path. On the other hand, when the gate is pivoted so as to assume its dotted line position document 16 passes in back of the gate and is fed into a tray 92 located beneath the recirculation apparatus for subsequent retrieval by the operator.

In accordance with the invention, document skew correction means 100 are provided beneath the drum, interior of lower belts 66, for straightening out a document which has been inserted askew into nip 58 or which has acquired a skew condition. Skew correction apparatus 100 comprises a bar 102, best seen in FIG. 2, which extends parallel to the transport path. Bar 102 includes a pair of ears 104 at its ends which pivotally support the bar on a fixed shaft 106. The bar is restrained from transverse movement along the shaft by a pair of "E" rings 108.

Three skew correction fingers, 110, 111 and 112 extend from the upper edge of bar 102. While only three fingers are shown in the illustrated embodiment, a greater number of fingers could be employed. Fingers 110, 111 and 112 are bent slightly rearward from the plane of member 102 and are transversely aligned so as to define an imaginary line which is parallel to the desired orientation of the document leading edge. The fingers are of sufficient length to extend into the document path closely adjacent nip 70, in a direction opposite the direction of movement of the document. The fingers thus extend through the document path, in interfering relation to the document movement, and extend into the drum diameter by providing a series of grooves in the drum surface which loosely receive the fingers. However, it should be noted that there is no physical engagement or contact between fingers 110, 111 and 112 and the drum surface.

Bar 102 includes a rear or lower portion 116 extending its entire width which comprises a substantial mass to normally gravity bias the bar and fingers into a solid line position shown in FIG. 1. In this solid line position, the fingers are in a position of extension into the document path. A stop 118 in the manner of a small pin defines a limit of movement of bar 102 to insure proper positioning of the fingers in the document path. The orientation of the bar and fingers after the document has exerted sufficient force to pivot the fingers out of the document path against the gravity biasing of portion 116, is depicted in dotted lines.

By reason of the configuration of the turnaround structure above described, it may be seen that a substantial open, unrestricted region exists between the lower nip of rollers 79–81 and the entrance nip 70 of the lower transport belts.

As the document is recirculated through the transport path, arcuate surface 90 directs leading edge 17 at the series of spaced apart fingers 110, 111 and 112. In the event the document is skewed in the manner shown in FIG. 2, the leading edge will not be parallel to the fingers and a portion 120 of the leading edge adjacent the left side edge of the document will be further advanced along the path of travel than a leading edge portion 122 adjacent the right side edge of the document. Thus, forwardmost leading edge portion 120 strikes skew correction finger 112 prior to the time that lagging edge portion 122 strikes finger 110. However, the document is being continuously conveyed in the direction of the fingers by the upper feed belts which firmly and positively grip the rear portion of the document. The upper feed belts also clamp the rear portion of the document to prevent movement thereof about an axis extending through the document plane.

Continuous conveyance of the rear portion in the direction of the fingers and the gravity biasing of the fingers into a position of interference with document movement results in localized buckling or rippling of the document adjacent the left side edge and rearward of the leading edge portion 120. However, the force of only left portion 120 of the leading edge striking finger 112 is insufficient to pivot or trip the bar into its dotted line position.

Further conveyance of the document in conjunction with the buckle adjacent the left side edge affords an opportunity for the center portion and then right edge portion 122 of the document leading edge to "catch up" with left edge portion 120 and engage fingers 111 and 110, respectively. By the time the left, center and right portions of the leading edge firmly engage fingers 112, 111 and 110 respectively, leading edge 17 assumes a straight orientation substantially parallel to the alignment of the fingers. As the leading edge simultaneously engages all of the fingers the document exerts a sufficient force against the fingers to pivot the bar in a counterclockwise direction thereby moving the fingers out of the document path. With the leading edge released from captivity by the fingers, it is conveyed to and immediately captivated by nip 70 of lower belts 66. Due to the close proximity of the fingers to nip 70, the leading edge is captivated by the nip in substantially the same straight condition in which it was released by the fingers. The buckle is retained in the left portion of the document as the leading edge enters nip 70 and is eliminated only when the trailing edge of the document passes the nip formed by rollers 79 and 81.

As noted from the above description, the upper feed belts which continuously convey the document, the fingers which inhibit movement of the forwardmost portion of the document leading edge and cause localized buckling of a portion of the document rearward of said forwardmost portion thereby allowing a short period of time for the remaining portions of leading edge to engage the fingers to orient the leading edge in a straight condition, and the entrance nip of the lower transport rollers which captivate the document in the straight condition presented thereto from the fingers, all cooperate to effect an efficient and highly corrective skew correction apparatus.

In accordance with the invention, it should be noted that the improved skew correction apparatus will continue to effect its skew correction function regardless of the curl which the document may assume adjacent its leading edge due to its repeated conveyance through the transport path. In the event the document does assume a curl, the leading edge is nevertheless guided into striking engagement with the fingers in the same manner as described above.

In addition, the skew correction apparatus of the invention does not rely upon pivotal movement of the document while in captivity of the transport means, thereby preventing possible smudges and stress from being imposed on an original document.

What has been described is a document turnaround, including improved means for automatically correcting the skewed condition of a document being recirculated therethrough for repeated passage past an exposure station.

It is obvious that upon study by those skilled in the art the disclosed invention may be altered or modified both in physical appearance and in construction without departing from its inventive concept. Therefore, the scope of protection to be given this invention should not be limited by the embodiment described above but should be determined by the essential descriptions thereof, which appear in the appended claims.

The embodiment of the invention in which an exclusive property or privilege is claimed is defined as follows:

1. In a copying machine having an exposure station, document transport apparatus defining a transport path for conveying an original document past said exposure station including means captivating and drivingly engaging both surfaces of said document for positively and uniformly transporting it in the direction of document skew correction means associated with said transport path in a manner which does not permit pivotal movement of the document about an axis generally normal to its plane; said document skew correction means comprising a pivotally mounted member extending thereacross generally perpendicular to the desired direction of movement of said document; means biasing said member into a normal position extending into said document path for intercepting a forwardmost portion of a leading edge of a skewed document conveyed thereto, thereby inhibiting forward movement of said forwardmost edge portion and causing localized buckling of the document only rearward of said leading edge portion for reorienting the leading edge in a skew correcting direction.

2. The document transport apparatus as set forth in claim 1 including a first transport nip spaced a substantial distance from said skew correction means in a direction opposite the direction of movement of said document and a second transport nip positioned closely adjacent said skew correction means in the same direction as the direction of movement of said document; said first and second nips defining an open region wherein buckling of said document is confined.

3. In a copying machine having an exposure station, document transport apparatus defining a transport path for conveying an original document past said exposure station; document skew correction means associated with said transport path comprising a plurality of pivotally mounted spaced apart fingers extending generally perpendicular to the desired direction of movement of said document; means biasing said fingers into a normal position extending into the document path for interception by at least one finger of a forwardmost portion of a leading edge of a skewed document; said transport apparatus including a first transport nip spaced a substantial distance from said skew correction means in a direction opposite the direction of movement of said document for positively and uniformly transporting said document in the direction of said skew correction means in a manner which does not permit pivotal movement thereof about an axis generally normal to its plane, and a second transport nip positioned closely adjacent said skew correction means in the same direction as the direction of movement of said document; first and second nips defining an open region; said fingers inhibiting forward movement of said forwardmost edge portion of the document and causing localized buckling of the document only rearward thereof in said open region until each of said fingers is uniformly engaged by the leading edge responsive to continued conveyance of the document; said document pivoting the fingers out of the transport path and releasing said leading edge and said leading edge being immediately thereafter captivated by said second nip in a skew corrected orientation.

4. The document transport apparatus as set forth in claim 3 including additionally: a selectively movable guide member for repeatedly guiding said document through the transport path and past the exposure station; a rotatable transport drum having a peripheral surface generally coincident with the transport path, said leading edge fortuitously assuming a curl responsive to repeated conveyance through said transport path, and wherein said guide cooperates with said leading edge to guide it toward said fingers regardless of the curl which said leading edge assumes.

References Cited
UNITED STATES PATENTS

| | | | |
|---|---|---|---|
| 3,545,743 | 12/1970 | Limberger | 271—53 |
| 1,914,849 | 6/1933 | Davidson | 271—53 |
| 3,356,364 | 12/1967 | Grigereit | 271—53 X |
| 3,246,591 | 4/1966 | Robertson | 271—51 X |
| 1,908,845 | 5/1933 | Hopkins | 271—53 |
| 2,627,203 | 2/1953 | Hessert | 271—53 UX |
| 3,547,535 | 12/1970 | McLean et al. | 271—51 X |

JOSEPH WEGBREIT, Primary Examiner

B. H. STONER, Jr., Assistant Examiner

U.S. Cl. X.R.

271—60; 355—48